C. F. BUCK.
APPARATUS FOR ROASTING AND BRIQUETING ORES.
APPLICATION FILED SEPT. 21, 1907.
899,507.
Patented Sept. 29, 1908.
4 SHEETS—SHEET 1.
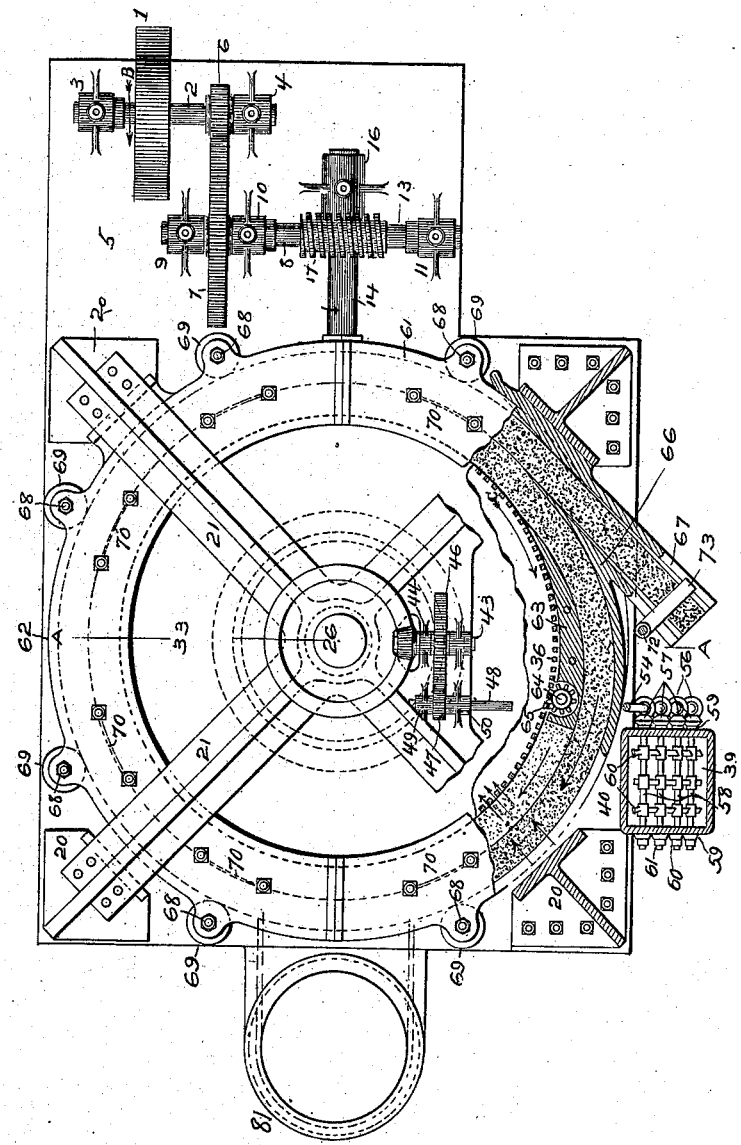
WITNESSES
INVENTOR

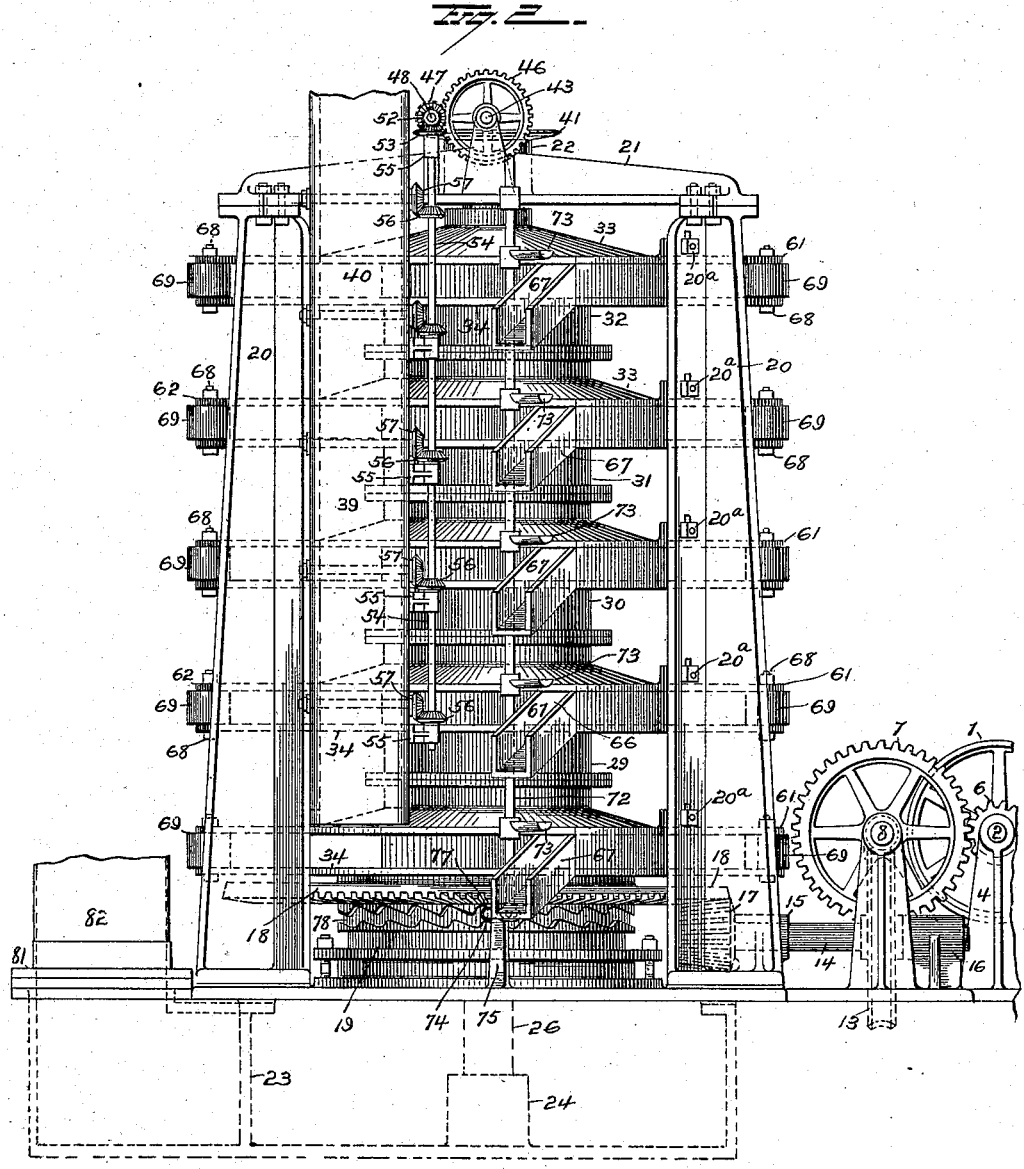

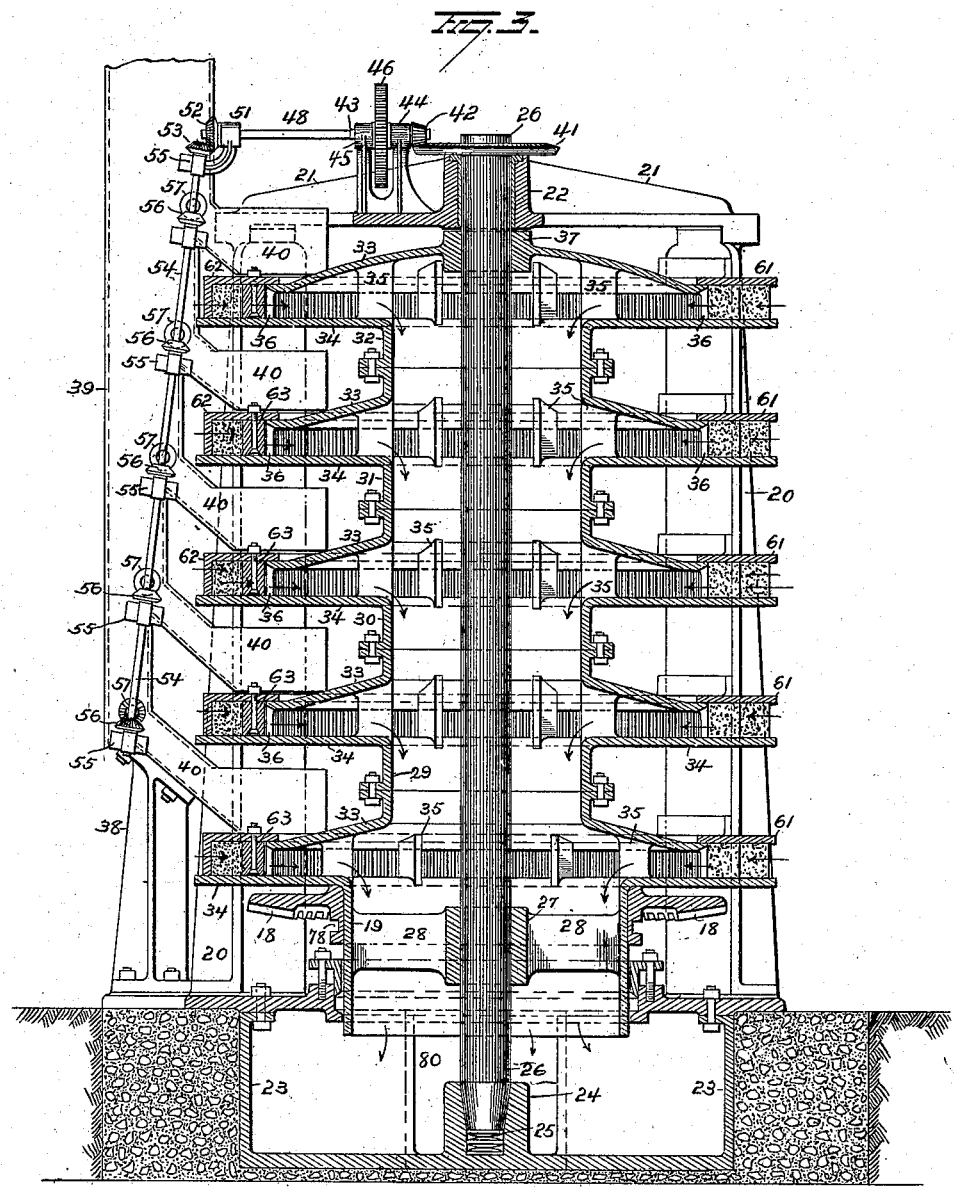

C. F. BUCK.
APPARATUS FOR ROASTING AND BRIQUETING ORES.
APPLICATION FILED SEPT. 21, 1907.
899,507.
Patented Sept. 29, 1908.
4 SHEETS—SHEET 4.
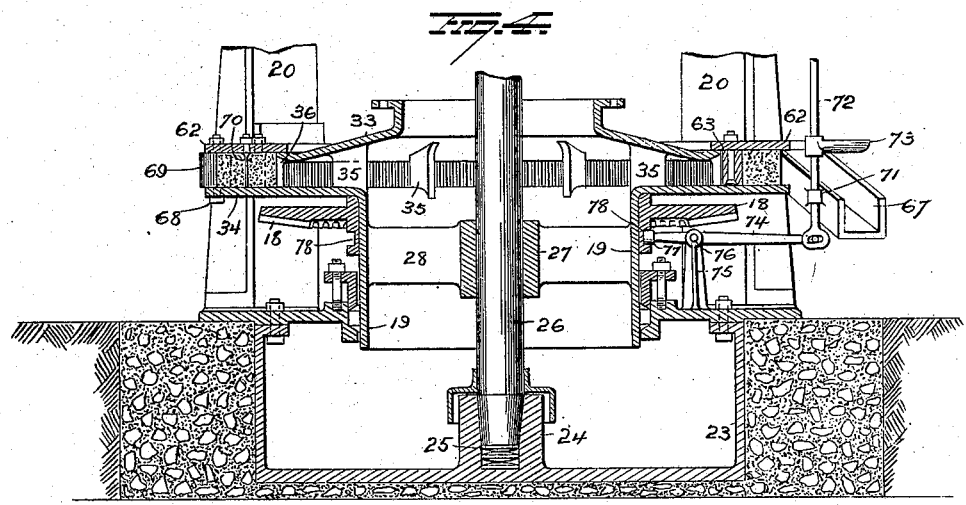
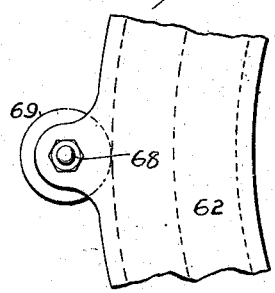
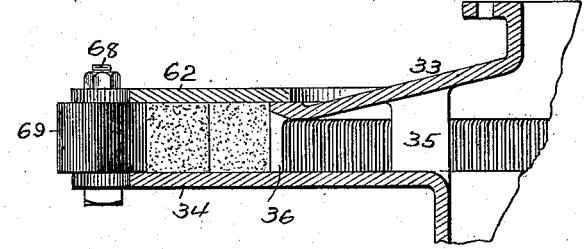
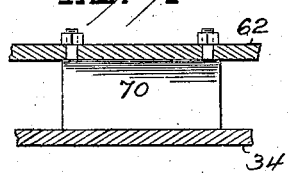
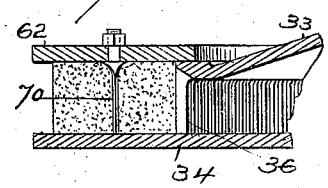
WITNESSES
INVENTOR
C. F. Buck
By H. A. Seymour
Attorney

UNITED STATES PATENT OFFICE.

CARL F. BUCK, OF NEW YORK, N. Y., ASSIGNOR OF ONE-HALF TO AUGUST HECKSCHER, OF HUNTINGTON, NEW YORK.

APPARATUS FOR ROASTING AND BRIQUETING ORES.

No. 899,507.            Specification of Letters Patent.          Patented Sept. 29, 1908.

Application filed September 21, 1907. Serial No. 393,930.

*To all whom it may concern:*

Be it known that I, CARL F. BUCK, of New York, in the county of New York and State of New York, have invented certain new and useful Improvements in Apparatus for Roasting and Briqueting Ores; and I do hereby declare the following to be a full, clear, and exact description of the invention, such as will enable others skilled in the art to which it appertains to make and use the same.

My invention relates to an improvement in apparatus for roasting and briqueting ores, the object being to provide an apparatus for the continuous roasting of ores containing sulfur or other natural fuel, without the use of any fuel other than that contained in the ore.

A further object is to provide a machine for coking the ore into a continuous mass, and subsequently breaking the coked mass into briquets or lumps of substantially uniform size.

With these ends in view my invention consists in the parts and combinations of parts as will be more fully described and pointed out in the claims.

In the accompanying drawings, Figure 1 is a plan view of the top of the machine with portions broken away to show the grate bars, and devices for cleaning the grate bars. Fig. 2 a view in front elevation. Fig. 3 is a section on line A A of Fig. 1. Fig. 4 is a view in section showing the mechanism for actuating the coke breaking device. Fig. 5 is a view in elevation of a section of the cam shown in Fig. 4. Fig. 6 is a view in section showing the two connected flanges, two masses of one and roller for retaining the latter in place on the table, and Figs. 7 and 8 are views of sections of upper flange and table showing the knives in side and edge elevation.

Motion is imparted to the moving parts of the apparatus by means of pulley 1 which may be driven by an electric motor or other suitable device and is keyed to shaft 2 journaled in bearings 3 and 4 on bed plate 5. Keyed to shaft 2 is gear wheel 6 which meshes with gear wheel 7 keyed to shaft 8 journaled in bearings 9, 10 and 11 on bed plate 5. On shaft 8 is worm 12 which engages worm gear 12 in mesh with worm gear 13, keyed to shaft 14, the latter being supported in bearings 15 and 16 on frame 5. Keyed to shaft 14 is bevel gear 17 meshing with gear 18, embracing and secured to the skirt of section 19 of the air drum. Secured to bed plate 5 are the upright standards 20, the upper ends of which are connected by the spider 21 having a central bearing 22, in which the upper end of vertical shaft is journaled.

23 is an air tight box secured to the underside of bed plate 5, and provided centrally with a bearing 24 in which are placed hardened steel buttons 25 on which the lower tapered end of the vertical shaft 26 rests. This shaft 26 is journaled at its upper end as above stated, in the bearing 22 formed in spider 1 and supports the air drum which will now be described. This air drum is composed of any number of sections, the lower one 19 of which is provided with inwardly projecting arms or spokes 28 terminating in a hub 27 which latter is keyed to the shaft 26. The lower end of section 19 of the air drum passes through a circular opening in the base plate and is suitably packed to render it approximately air tight. The air drum is, in the present instance, composed of five sections 19, 29, 30, 31 and 32, all of which are alike except that section 19 has a longer skirt than the others and is provided with a hub and spokes, while the top section 32 is provided with a closed top.

Projecting from and integral with each of the five sections, intermediate the ends of the latter, are the flanges 33 and 34 the former of which incline downwardly and outwardly, while the latter are horizontal, the two flanges of each section being connected by a series of integral ribs 35 located at the inner edges of the flanges 33 and 34, and by the integral vertical grate bars 36 located at the outer edges of the upper flanges 33. The spaces between the flanges 33 and 34 are in direct communication with the interior of the air drum, and are in effect lateral enlargements of the same. The lower flanges 34 of each section form tables on which the ore is deposited and on which it is roasted, and will hereinafter be referred to as tables. The flange 33 of the upper section 32 of the air drum is continued over the drum and forms the top thereof, and is provided centrally with the hub 37 through which the vertical shaft 26 passes, the hub 37 being secured to the shaft in such a manner as to make an air tight connection therewith. The several sections constituting the air drum are provided with flanged ends, and are secured together by bolts passing through said flanges, thus constituting a hollow structure with openings between each flange 33 and table 34.

From the construction thus far described it will be seen that by imparting movement to pulley 1 in the direction shown by the arrow B, the air drums will, through the gearing described, be revolved in the direction shown by arrows C.

Secured to bed plate 5 is a chair 38 supporting the ore spout 39, from which branches a series of short spouts 40, one for each table 34, which direct and deposit the ore on the tables in a position between the partly roasted ore and the grate bars 36.

Keyed to the top of shaft 26 is bevel gear 41 which meshes with a smaller bevel gear 42 on shaft 43 which latter is journaled in bearings 44 and 45 on spider frame 21. Shaft 43 carries gear wheel 46 which meshes with smaller wheel 47 on shaft 48, the latter being journaled in bearings 49 and 50 on spider frame 21, and in bearing 51 carried by ore spout 39. Shaft 48 carries a bevel gear wheel 52 meshing with a similar gear 53, keyed to end of shaft 54 which latter is journaled in bearings 55 secured to ore spout 39. Also keyed to shaft 54 are the bevel gears 56, (one for each spout 40) which mesh with bevel gears 57 on shafts 58 journaled in bearings 59 on ore spout 36, and carrying the rabbles 60, the shafts 58 being held against endwise displacement by means of collars 61 secured to the shafts outside the spouts 40. From this construction it will be evident that when shaft 26 carrying the air drum is rotated, the shafts 58 and rabbles 60 will also rotate, and thus prevent the ore passing through spouts 39 from clogging and also direct a portion of the ore into the small spouts 40.

Secured to standards 20 by bolts 20ª are plates 61 and 62 one set for each table. These plates are semi-circular in shape and conform in size to the tables 34 and overlap at their inner ends the outer edges of flanges 33. Cover plates 61 are located at the sides opposite the spout, while cover plates 62 are adjacent to spouts and ejecting spouts, and are provided at their peripheries throughout a portion of their lengths with depending flanges extending down to the tables 34 thus inclosing the space between the flanges and tables, and it is onto these inclosed portions of the table that the partly roasted ore is moved away from the grate as will be hereinafter described. Secured to the underside of plates 62, just in rear of the ore spouts 40, as shown in Fig. 1, are the hardened steel plows 63, which latter are approximately V-shape, but curved throughout their lengths as shown, to conform to the circular formation of the machine, the inner faces of the plows resting adjacent to the grate bars 36. These plows are located just in rear of the spouts 40 and at their rear ends, are of a thickness approximately equal to the width of the body of raw ore deposited on the tables 34, their front ends being pointed and terminating adjacent to the grate bars 36 for the purpose of deflecting the partly roasted ore, which has made nearly one complete revolution, away from the grate bar, so as to provide space adjacent to the latter for the introduction of the raw ore, as clearly shown in Fig. 1. Also secured to the underside of the fixed plates 62 are the axles 64 upon which are journaled the grate cleaning wheels 65, the teeth of which mesh with, or enter between the grate bars, and forcibly eject into the air drums any material which may find lodgment between the bars.

66 are approximately V-shaped plows, (one for each table) secured to the underside of plates 62, with their ends projecting in rear of the plows 63, and integral with these plows 66 are the spouts 67. These plows 66 are located in a position to separate the roasted ore which has made nearly two revolutions from the partly roasted ore, which has made but a single revolution, and direct the outer mass of roasted ore into the spouts 67, while the plows 63 deflect the mass of partly roasted ore to a position removed from the grate bars so as to permit the new ore to be introduced between the grate bars and the partly roasted ore.

Journaled on axles 68 carried by the plates 61 and 62, are the guide rollers 69, which are located in positions to hold the ore in place between the plates and tables 34 as it is carried around on the tables, which latter as clearly shown, project outwardly beyond the flange 33 and forms the support on which the ore is deposited and on which it rests, and on which it is roasted.

Depending from the bottom of plates 61 and 62 are the knives 70, located about midway the width of the plates and operating to keep the two masses of ore from sticking or matting together during the roasting operation.

Journaled in bearings 71 on the spouts 67 and spider frame 21, is the vertical rod 72 upon which are secured the horizontal breaker arms 73, one for each discharge spout 67. The bearing 71 on the spider frame for rod 72, is square so as to permit free vertical movement of the rod, but prevent the same from rotating. The bottom of shaft 72 is fulcrumed to bell crank lever 74, which is pivoted in bearings 75 on bed plate 5 by means of pin 76. Mounted on end of bell crank lever 74 is roller 77 which fits into cam groove 78 in band 79 secured to lower section 19 of air drum. The object of this mechanism is to cause the shaft 72 and arms 73 to move up and down and by this means break the stream of roasted ore into briquets, or pieces of suitable length as it is fed out of spout 67.

Projecting out from box 23 is an air duct 80 the top of which is rounded off to receive the flange 81 of an air pipe 82 which is connected to an exhaust fan or any suitable device for drawing the air through the grate bars 36 thence to air drum and out through air pipe 82.

The operation of the machine is as follows: The ore is first crushed fine, then mixed with water and fed while damp or wet, into the spout 39. This spout is larger at the top than at the bottom and the bottoms of the spouts project outwardly beyond the bottom of the spout next above, so that each spout receives its proper proportion of the wet ore. These spouts 40 discharge the ore onto the ore carrying tables 34 just in advance of the plows 63 and in contact with the grate bars, so that in starting, and until the machine has made nearly a complete revolution, there is but one stream or mass of ore on each table 34. At the commencement of the operation the exhaust fan is started, drawing air through the ore and grate bars, and at this juncture a torch or flame is applied in a position where it will strike the ore as it starts on its journey. The torch or flame is held in this position until the revolving portion of the apparatus has made one complete revolution. After the machine has made one complete revolution, the ore which has been ignited is moved out to a position on the circular table 34 by the plow 63. The raw ore then falls in a position between the burning ore and the grate bars and is ignited by coming in contact with the burning ore. After the revolving portion of the machine has made two complete revolutions, the ore which has also made two revolutions, will be thoroughly roasted and ready to leave the machine. It will be noticed by referring to Fig. 1 that the plow 66 deflects the roasted mass of ore out through the spout 67 and under the arms 73. The arms 73 moving up and down by means of mechanism before described, break the roasted ore off into lengths of suitable size so as to be handled easily. The operation from this point becomes continuous as long as the ore is fed into the ore spout 36.

In the ore passing around, the two masses are kept from matting together by means of the knives 70, and are held in position on the circular projection 34 by means of rollers 69.

It is evident that many slight changes might be resorted to in the relative arrangement of the parts shown and described without departing from the spirit and scope of my invention hence I would have it understood that I do not wish to confine myself to the exact construction and arrangement of parts shown and described but consider myself at liberty to make such slight changes and alterations as fairly fall within the spirit and scope of my invention.

Having fully described my invention what I claim as new and desire to secure by Letters-Patent, is:—

1. In an ore roasting apparatus the combination with a rotating table and a grate carried thereby, of means for depositing the raw ore on the table between the grate bars and the partly roasted ore.

2. In an ore roasting apparatus the combination with a rotating table and a grate thereon, of means for moving the partly roasted ore away from the grate and means for depositing the raw ore onto the rotary table between the partly roasted ore and the grate.

3. In an ore roasting apparatus the combination with a rotary table, a central air drum and means for depositing raw ore on the table, of means for deflecting the partly roasted ore outwardly on the table so as to permit the raw ore to be deposited on the table intermediate the center of the air drum and the partly roasted ore.

4. In an ore roasting apparatus, the combination with a table a central air drum, and means for depositing raw ore on said table, of means for deflecting the partly roasted ore outwardly on the table, so as to permit the raw ore to be deposited on the table between the center of air drum and the partly roasted ore, and means for discharging the roasted ore.

5. In an ore roasting apparatus, the combination with a rotary air drum having spaced flanges the lower one of which forms a table for the ore, of means for depositing the ore on said table within the belt or stream of partly roasted ore, means for deflecting the partly roasted ore outwardly and means for ejecting the roasted ore.

6. In an ore roasting apparatus the combination with a rotary air drum having spaced flanges the lower one of which forms a table for the ore, and a grate connecting said flanges, of means for deflecting the burning ore away from the grate, means for depositing the raw ore between the grate and the burning ore, and means for producing a draft through the burning ore, raw ore and the grate.

7. In an ore roasting apparatus the combination with a rotary table, means for depositing raw ore thereon, means for deflecting the roasted ore laterally and means for breaking the roasted ore into briquets.

8. In an ore roasting apparatus, the combination with a rotary support for the ore, means for deflecting the burning ore laterally, means for depositing raw ore to the inner side of the mass of burning ore, means for ejecting the roasted ore and means for breaking up the mass of roasted ore as it emerges from the apparatus.

9. In an ore roasting apparatus the combination with a series of superimposed connected air drum sections, closed at the top and communicating below with a draft flue, each section having projecting flanges one of which forms a table for the ore, of means for supplying raw ore to the several tables, means for deflecting the ore laterally after it has made approximately one rotation, and means for ejecting it at the end of the second rotation.

10. In an ore roasting apparatus, the combination with a series of superimposed connected air drum sections each having two projecting flanges one of which forms a table for the ore, a grate connecting said flanges, and means for rotating said air drum, of means for depositing raw ore on the tables adjacent to the grates, and means for shifting the burning ore laterally from the grate.

11. In an ore roasting apparatus the combination with a series of superimposed connected air drum sections, each having two projecting flanges one of which forms a table for the ore, a grate connecting each pair of flanges and means for rotating the drum, of means for shifting the burning ore laterally away from the grate means for depositing the raw ore between the burning ore and the grate and means for ejecting the roasted ore.

12. In an ore roasting apparatus, the combination with a series of superimposed connected air drum sections closed at the top and communicating below with an air flue, each section having a pair of flanges one of which forms a table for the ore, a grate connecting the two flanges of each section, and means for rotating the drum, of troughs for supplying ore to the several tables, means for ejecting the roasted ore from the several tables and means for breaking up the masses of ore as they are ejected from the apparatus.

13. In an ore roasting apparatus, the combination with a series of connected air drum sections, each having projecting flanges the lower one of which projects beyond the other and forms a table for the ore, of fixed top plates under which the ore travels, and means carried by said top plate for shifting the burning ore laterally and for ejecting it from the apparatus.

14. In an ore roasting apparatus, the combination with a series of connected air drum sections each having a pair of projecting flanges one of which projects beyond the other and form a table for the ore and means for rotating said drum, of troughs for supplying raw ore to the several tables, fixed cover plates, and a plow carried by one cover plate of each table for deflecting the burning ore laterally.

15. In an ore roasting apparatus, the combination with a series of connected air drum sections, each having a pair of projecting flanges, one of which projects beyond the other and forms a table for the ore, of fixed cover plates located over and parallel with the table, a plow carried by a cover plate of each table for deflecting the burning ore laterally, and depending cutters carried by the cover plates for separating the ore in the inner mass or stream from that on the outer side, and means for supplying raw ore to the tables within the mass of burning ore.

16. The combination with an apparatus for roasting ores and means for ejecting the roasted mass of ore from the apparatus, of a breaker for breaking up the mass as it emerges from the roaster.

17. In an ore roasting apparatus the combination with a rotating table and grate carried thereby, of means for depositing the raw ore on the table between the grate and the partly roasted ore, and means for clearing the spaces between the grate bars.

18. In an ore roasting apparatus the combination with a rotating table and a grate carried thereby, of means for depositing the raw ore on the table intermediate the grate bars and the partly roasted ore, and a toothed wheel, the teeth of which enter between the grate bars and operate to keep the spaces between the bars open.

19. In an ore roasting apparatus, the combination with a rotating table, grate bars thereon, and means for deflecting the mass of partly roasted ore from the bars, of rollers mounted on fixed axles and located in positions to hold the mass of ore on the table.

20. In an ore roasting apparatus the combination with a series of superimposed connected rotating tables and a draft flue central to all of said tables, of means for depositing raw ore on each rotating table, and a series of rollers for each table, the said rollers operating to hold the masses of ore on the tables.

21. In an ore roasting apparatus, the combination with a series of superimposed connected air drum sections, closed at the top, a draft flue in communication with the lower end of the air drum, an air tight connection between the air drum and flue, each air drum section having projecting flanges one of which forms a table for the ore, of means for supplying raw ore to the several tables, means for deflecting the ore laterally after it has made approximately one rotation and means for ejecting the ore at the end of the second rotation.

22. In an ore roasting apparatus, the combination with a series of superimposed connected tables, and means for rotating same, of an ore spout, a short spout leading therefrom to each table, and rabbles in the mouth of each short spout for agitating the ore and feeding it into the short spouts.

23. In an ore roasting apparatus, the combination with a series of superimposed connected rotating tables and a main spout for the entire series of tables, of a short spout leading from the main spout to each table, the floor of each short spout projecting outwardly beyond the floor of the short spout next above and a rabble located adjacent the mouth of each short spout.

In testimony whereof, I have signed this specification in the presence of two subscribing witnesses.

CARL F. BUCK.

Witnesses:
A. W. BRIGHT,
HENRY J. GROSS.